(12) United States Patent
Messina

(10) Patent No.: US 6,604,794 B1
(45) Date of Patent: Aug. 12, 2003

(54) UNI-PILOT HUB/DRUM SYSTEM

(75) Inventor: Paul R. Messina, Vandalia, OH (US)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 0 days.

(21) Appl. No.: 10/066,605

(22) Filed: Feb. 4, 2002

(51) Int. Cl.$^7$ .......................... F16D 65/10; B60B 19/00
(52) U.S. Cl. ............... 301/6.6; 301/63.101; 188/218 R; 188/206 R
(58) Field of Search .................... 301/6.6, 6.7, 105.1, 301/63.101, 63.307; 188/218 R, 206 R, 18 A, 18 R

(56) References Cited

U.S. PATENT DOCUMENTS

| | | | | | |
|---|---|---|---|---|---|
| 1,555,137 A | * | 9/1925 | Main et al. | ................... | 301/6.1 |
| 1,611,664 A | * | 12/1926 | Murray | ....................... | 301/6.7 |
| 2,080,895 A | * | 5/1937 | Nelson | ........................ | 29/414 |
| 2,094,637 A | * | 10/1937 | Burger | ....................... | 301/6.7 |
| 3,630,323 A | * | 12/1971 | Hickle | ........................ | 188/118 |
| 3,989,305 A | * | 11/1976 | Umeda et al. | ................ | 301/6.6 |
| 4,421,197 A | * | 12/1983 | Chandioux | ................... | 180/258 |
| 4,456,308 A | * | 6/1984 | Opel et al. | ............. | 301/35.626 |
| 4,699,433 A | * | 10/1987 | Kopp | ........................ | 301/6.6 |
| 5,328,008 A | * | 7/1994 | Sano | ........................ | 192/17 R |
| 5,890,567 A | | 4/1999 | Pete | | |
| 6,145,632 A | * | 11/2000 | Rutter | ....................... | 188/18 R |

* cited by examiner

Primary Examiner—S. Joseph Morano
Assistant Examiner—Long Bao Nguyen
(74) Attorney, Agent, or Firm—Carlson, Gaskey & Olds

(57) ABSTRACT

A vehicle wheel assembly includes a hub, a drum, and disc wheels that are mounted together for rotation about a common axis. The hub has a cylindrical body with a hub mounting flange that extends out radially from the body. The body defines an exterior surface having a common drum and wheel pilot. The drum has a drum mounting flange with a peripheral edge that is aligned relative to the drum and wheel pilot. The disc wheels each have wheel mounting flanges with a peripheral edges aligned relative to the drum and wheel pilot. Thus, the drum and wheels are mounted on a common pilot surface formed on the hub. The single pilot significantly reduces the occurrence of drum misalignment and possible drum fracture.

18 Claims, 2 Drawing Sheets

UNI-PILOT HUB/DRUM SYSTEM

BACKGROUND OF THE INVENTION

This invention relates to a method and apparatus for mounting a drum and disc wheels onto a wheel hub. Specifically, the invention relates to a hub having a common pilot for both the drum and the disc wheels.

It is important to maintain proper position and alignment when mounting drums and disc wheels on a wheel hub. This is especially important for wheel hubs and drums that are used in heavy vehicle applications where wheel components are subjected to shock loads. Traditionally, a wheel end assembly includes a hub, a drum, and a disc wheel. The hub, drum, and disc wheels each have mounting flanges that are secured together during assembly. The wheel hub includes a drum pilot and a disc wheel pilot formed about the exterior surface of the hub where the drum and wheel pilots are of different diameters. Typically, the drum pilot is of a greater diameter than the disc wheel pilot.

The pilots are important because the pilots guide and properly position the drum and wheels on the hub. First the drum is installed on the drum pilot and then the disc wheels are installed on the wheel pilot. The hub, drum, and disc wheels are then secured together with fasteners through the respective mounting flanges. During installation of the drum onto the drum pilot, it is important that the mounting flange on the drum be flush with the mounting flange of the hub. Further, it is important that the mounting flange of the disc wheel be flush with the drum mounting flange.

Because the hub has multiple pilots, installation of the drum and wheels can be difficult. As the drum is installed on the hub, it can become hung up on the transition between the wheel and drum pilots resulting in an improper installation. Once the drum is installed improperly it is very difficult to properly mount and position the disc wheels. Improper mounting can result in premature component wear and potential component facture at high loads.

Thus, it is desirable to provide a hub with an improved pilot surface to facilitate installation of the drum and wheels in addition to overcoming the other above referenced deficiencies in the prior art.

SUMMARY OF THE INVENTION

A vehicle wheel assembly includes a wheel hub with a cylindrical body that presents a single or common exterior hub pilot. The single hub pilot is the mount for a drum and at least one disc wheel. The wheel drum has a drum mounting flange with a peripheral edge that is aligned relative to the hub pilot. The disc wheel includes a wheel mounting flange with a peripheral edge that is aligned relative to the hub pilot. The drum and disc wheel are mounted to the wheel hub for rotation about a common axis.

The wheel hub has a hub mounting flange that extends transversely to the hub body and which is parallel to the drum mounting flange and the wheel mounting flange. The hub, drum, and wheel mounting flanges are secured together with a plurality of fasteners spaced about the circumference of the mounting flanges.

In the preferred embodiment, the peripheral edge of the drum mounting flange includes a first segment with a linear profile and a second segment that extends transversely to the first segment. The first segment is aligned relative to the pilot mounting surface. The hub includes a hub transition region between the hub pilot and the hub mounting flange. The hub transition region includes a curved or angled surface. The second segment on the edge of the drum mounting flange is positioned opposite from the hub transition region.

The single hub pilot provides a simplified method and apparatus for mounting drums and disc wheels on wheel assemblies. The single pilot also reduces potential misalignment between the drum and/or the disc wheels and the hub. These and other features of the present invention can be best understood from the following specifications and drawings, the following of which is a brief description.

DETAILED DESCRIPTION OF A PREFERRED EMBODIMENT

Figure 1:
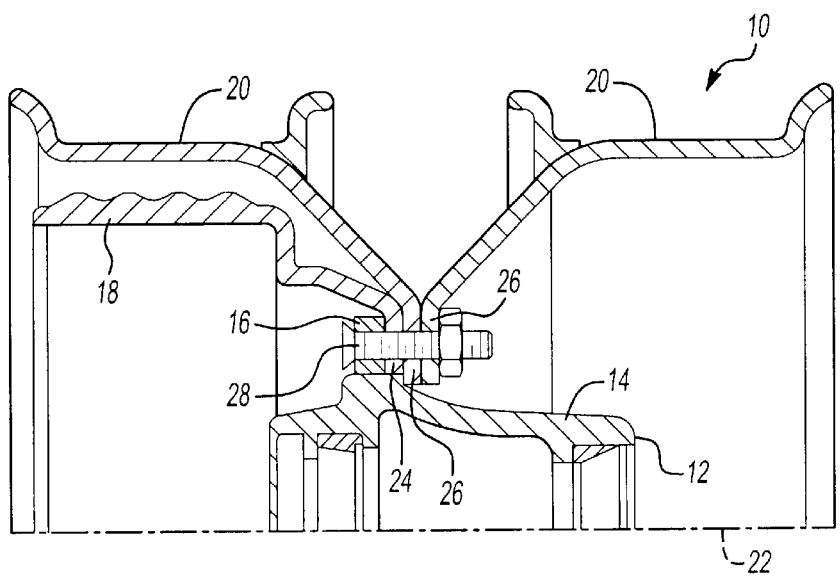
FIG. 1 is a cross-sectional view, partially cut-away, of a prior art wheel assembly.

A traditional wheel end assembly is shown generally at 10 in FIG. 1. The wheel end assembly 10 includes a hub 12 with a cylindrical body portion 14 and a transversely extending hub mounting flange 16. A drum 18 and disc wheels 20 are mounted to the hub 12 for rotation with the hub 12 about a common axis 22. Preferably a pair of disc wheels 20 are mounted to the hub 12 for a rear wheel assembly, however, a single disc wheel 20 for a front wheel assembly could also be used. Tires (not shown) are mounted to the disc wheels 20.

The drum 18 includes a drum mounting flange 24 and each disc wheel 20 includes a wheel mounting flange 26. The drum 24 and wheel 26 mounting flanges are parallel to the hub mounting flange 16. A plurality of fasteners 28 (only one is shown) secure the hub 16, drum 24, and wheel 26 mounting flanges together. The fasteners 28 are installed about the circumference of the wheel hub 12.

Figure 2:
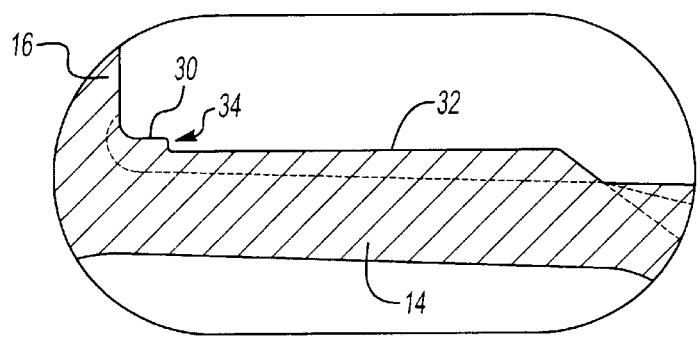
FIG. 2 is a magnified view of a prior art drum and disc wheel pilot portion on the hub of FIG. 1.

As shown in FIG. 2, the body portion 14 of the hub 12 traditionally presents an exterior surface that includes a drum pilot surface 30 and a wheel pilot surface 32. Both of these pilot surfaces 30, 32 extend about the circumference of the wheel hub 12. The drum pilot surface 30 is of greater diameter than the wheel pilot surface 32. The pilot surfaces 30, 32 can be continuous pilot circles, however, the pilot surfaces are typically intermittent, i.e., non-continuous pilot circles. The intermittent pilot surfaces are preferred to facilitate disassembly of the wheel components. The wheel components corrode over time, which causes material buildup in the gap between the pilots. The non-continuous pilot surfaces allow the corroded wheel components to be easily disassembled.

Because the hub 12 has pilot surfaces 30, 32 of different diameters, installation of the drum 18 and wheels 20 can be difficult. As the drum 18 is installed on the hub 12, it can become hung up on a transition area 34 between the wheel 32 and drum 30 pilot surfaces resulting in an improper installation. Once the drum 12 is installed improperly it is very difficult to properly mount and position the disc wheels 20. Improper mounting can result in premature component wear and potential component fracture at normal operational loads.

Figure 3:
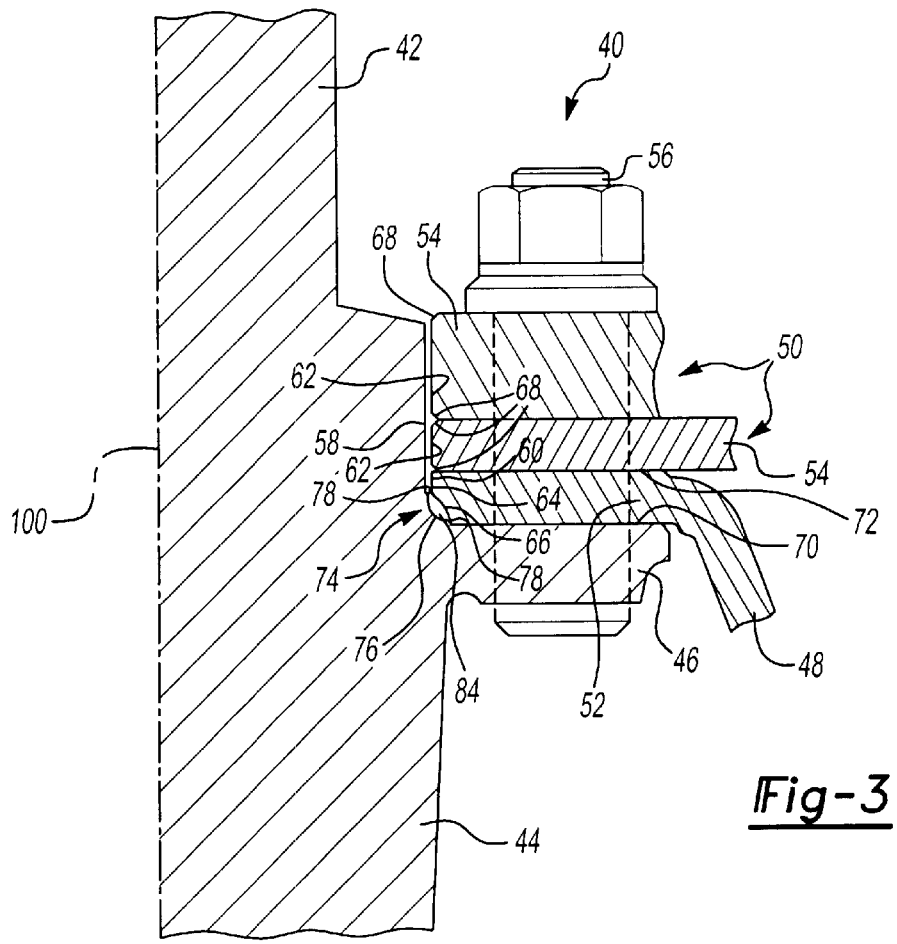
FIG. 3 is a cross-sectional view, partially cut-away, of a vehicle wheel assembly incorporating the subject invention.

A rear wheel end assembly incorporating the subject invention is shown generally at 40 in FIG. 3. The wheel end assembly 40 includes a hub 42 with a cylindrical body portion 44 and a transversely extending hub mounting flange 46. A drum 48 and disc wheels 50 are mounted to the hub 42 for rotation with the hub 42 about a common axis 100. Preferably a pair of disc wheels 50 are mounted to the hub 42, however, a single disc wheel 50 could also be used. Single disc wheels are normally used on front or steeling axle wheel assemblies, however, the invention could also be used in a rear wheel assembly with a single disc wheel.

Figure 6:
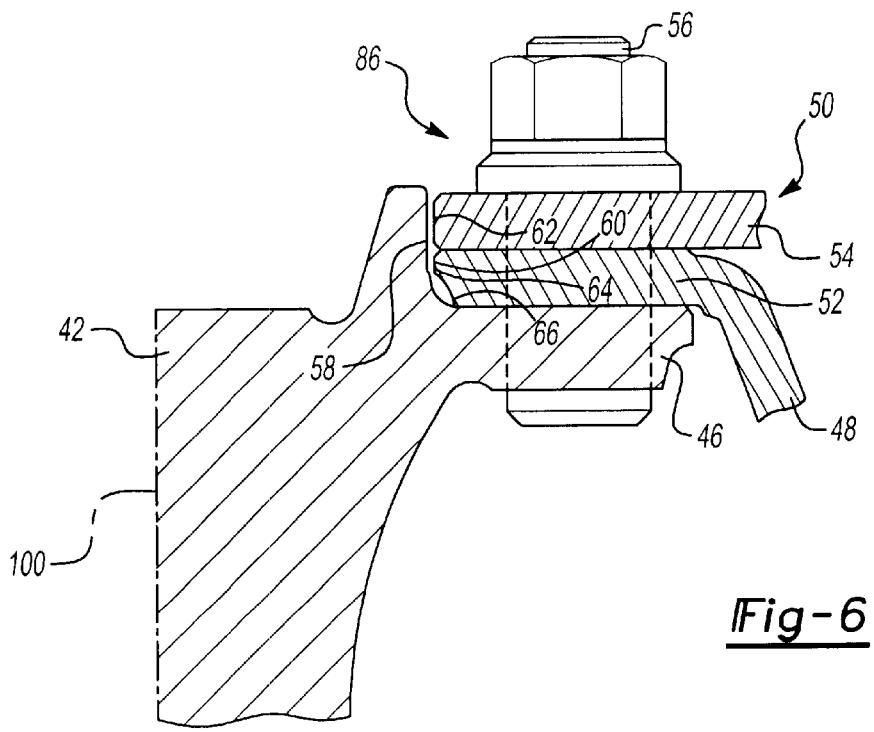
FIG. 6 is a cross-sectional view, partially cut-away, of a front vehicle wheel assembly incorporating the subject invention

Although a rear wheel assembly 40 is shown in FIG. 3, it should be understood that the subject invention could also be utilized on a front wheel assembly 86 where a single wheel is mounted on the hub as shown in FIG. 6. The description below with regard to the hub 42, drum 48, and disc wheel 50 of FIG. 4 is also applicable to wheel assembly 86 of FIG. 6.

Figure 4:
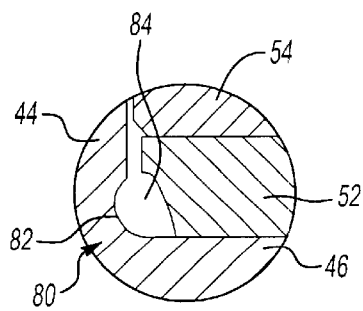
FIG. 4 is an alternate embodiment of a vehicle wheel assembly incorporating the subject invention.

As shown in FIG. 4, the drum 48 includes a drum mounting flange 52 and each disc wheel 50 includes a wheel mounting flange 54. The drum 52 and wheel 54 mounting flanges are parallel to the hub mounting flange 46. A plurality of fasteners 56 (only one is shown) secure the hub 46, drum 52, and wheel 54 mounting flanges together. The fasteners 56 are installed about the circumference of the wheel hub 42.

The hub 42 presents an exterior surface that forms a single pilot 58 for both the drum 48 and the disc wheels 50, i.e., the drum 48 and wheels 50 are mounted on a common pilot surface. The drum mounting flange 52 includes a peripheral edge 60 that is aligned relative to the pilot 58 and the wheel mounting flanges 54 include peripheral edges 62 that are also aligned relative to the pilot 58. The peripheral edge 60 of the drum mounting flange 52 includes a first portion or segment 64 presenting a linear profile and a second portion or segment 66 that extends transversely to the first portion 64. the second portion 66 can present a curved or angled profile. The first portion 64 is aligned relative to the pilot 58. The transition from the first portion 64 to the second portion 66 facilitates installation of the drum 48 on the hub 42. The peripheral edges 62 of the wheel mounting flanges 54 are beveled or chamfered 68 to facilitate assembly of the disc wheels 50 on the hub 42.

The drum mounting flange 52 includes a first mounting surface 70 in abutting engagement with the hub mounting flange 46 and a second mounting surface 72 in abutting engagement with one of the wheel mounting flanges 54. The peripheral edge 60 of the drum mounting flange 52 extends between the first 70 and second 72 mounting surfaces such that the first portion 64 extends from the second mounting surface 72 and the second portion 66 transitions from the first portion 64 to the first mounting surface 70.

A hub transition area 74 from the casting process is formed between the pilot 58 and the hub mounting flange 46. The hub transition area 74 formed during the casting process presents a third portion or segment 76 that extends transversely to the pilot 58 and the hub mounting flange 46. In one embodiment, shown in FIG. 3, the hub transition area 74 is raised with a pair of steps 78, formed during the machining process, and which extend outwardly from the hub 42 on either side of the third portion 76. In this embodiment, the third portion 76 presents a curved surface that extends between the steps 78.

Figure 5:
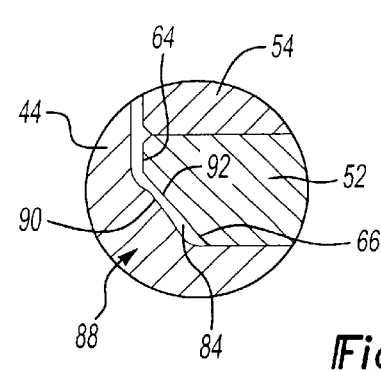
FIG. 5 is an alternate embodiment of a vehicle wheel assembly incorporating the subject invention.

An alternate hub transition area 80 is shown in FIG. 4. This hub transition area 80 presents a curved surface 82 that is recessed within the body 44 of the hub 42. Another alternate hub transition area 88 is shown in FIG. 5. This hub transition area 88 presents an angled surface 90 that parallels an angled surface 92 formed on the second portion 66 of the drum mounting flange 52. When the drum 48 is installed on the hub 42 gap 84 is formed between the third portion of the hub transition region 74, 80, or 88 and the second portion 66 of the peripheral edge 60 of the drum mounting flange 52.

One of the advantages of the subject invention is that a single pilot 58 is used to mount both the drum 48 and the wheels 50. The single hub pilot 58 is preferably designed with a tolerance range of 0.15 mm to 0.025 mm smaller than the pilot on the wheels 50 mounted on the hub 42. The single pilot 58 removes the possibility of misslocating the drum 48 and thus avoids potential brake drum fracture. The tighter tolerance on the hub pilot 58 improves run-out characteristics of the wheel end assembly 40 by improving concentric fit between the wheels 50 and the hub 42. The improved concentric fit also reduces potential wheel/tire imbalance associated with traditional wheel end assemblies.

The peripheral edge 60 that forms the pilot surface of the drum 48 is preferably designed within a tolerance range of 0.025 mm to 0.1 mm larger than on the maximum pilot 58 of the hub 42. The pilot of the drum 48 is located from the outboard edge of the drum mounting flange 52, with a leading edge chamfer or sharp edge break, for a length of 6.096 mm maximum from the outboard side of the drum mounting flange 52 for cast brake drums (as mounted on the vehicle). The unique profile for the edge 60 forming the drum pilot is located further outboard on the drum mounting flange 52 then on traditional drums. This reduces the occurrence of interference due to a build up of corrosion on the hub 42 or other casting/machining anomalies between the pilot 58, mounting flange 46, and other areas of the hub 42. The area on the hub 42, inboard of the pilot 58 on the drum 42, can be relieved by a cast or machined, radius or chamfer, allowing clearance to this hub area.

The method of assembling the vehicle wheel assembly including the steps of forming a single pilot mount 58 on an exterior surface of the wheel hub 42, positioning the drum 48 on the wheel hub 42 by engaging a portion of the drum 48 against the pilot mount 58, and positioning the disc wheel 50 on the wheel hub 42 by engaging a portion of the disc wheel 50 against the pilot mount 58. The hub 42, drum 48, and disc wheel 50 are then secured together for rotation about a common axis.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle wheel assembly comprising:
   a wheel hub including a cylindrical body portion presenting a single exterior hub pilot mounting surface;
   a wheel drum including a drum mounting flange with a peripheral edge aligned relative to said hub pilot mounting surface; and
   at least one disc wheel including a wheel mounting flange with a peripheral edge aligned relative to said hub pilot mounting surface wherein said wheel drum and said disc wheel are mounted to said wheel hub for rotation about a common axis.

2. The assembly of claim 1 wherein said wheel hub includes a hub mounting flange extending transversely to said body portion and parallel to said drum mounting flange and said wheel mounting flange.

3. The assembly of claim 2 wherein said hub, drum, and wheel mounting flanges are secured together with at least one fastener.

4. The assembly of claim 3 wherein said drum mounting flange is positioned between said hub and wheel mounting flanges.

5. The assembly of claim 2 wherein said peripheral edge of said drum mounting flange includes a first segment extending in a first direction and a second segment extending in a second direction that is transverse to said first direction, said first segment having a linear profile aligned relative to said pilot mounting surface.

6. The assembly of claim 5 wherein said drum mounting flange includes a first mounting surface in abutting engagement with said hub mounting flange and a second mounting surface in abutting engagement with said wheel mounting flange with said peripheral edge extending between said first and second mounting surfaces such that said first segment extends from said second mounting surface and said second segment transitions from said first segment to said first mounting surface.

7. The assembly of claim 6 including a hub transition region between said pilot mounting surface and said hub mounting flange, said hub transition region defining a third segment that extends transversely to said pilot mounting surface and said hub mounting flange.

8. The assembly of claim 7 including a gap formed between said third segment and said second segment of said peripheral edge of said drum mounting flange.

9. The assembly of claim 8 including a first step at said pilot mounting surface and a second step at said hub mounting flange, said first and second steps extending outwardly from said hub with said third segment extending between said first and second steps.

10. A vehicle wheel assembly comprising:

a hub including a cylindrical body portion with a transversely extending hub mounting flange, said body portion presenting an exterior surface defining a common drum and wheel pilot;

a drum including a drum mounting flange with a peripheral edge aligned relative to said drum and wheel pilot; and at least one disc wheel including a wheel mounting flange with a peripheral edge aligned relative to said drum and wheel pilot.

11. The assembly of claim 10 wherein said hub, drum, and wheel mounting flanges are secured together with at least one fastener.

12. The assembly of claim 11 wherein said peripheral edge of said drum mounting flange and said peripheral edge of said wheel mounting flange have the same diameter.

13. The assembly of claim 12 wherein said peripheral edge of said drum mounting flange includes a first segment extending in a first direction and a second segment extending in a second direction that is transverse to said first direction, said first segment having a linear profile aligned relative to said drum and wheel pilot.

14. The assembly of claim 13 wherein said drum mounting flange includes a first mounting surface in abutting engagement with said hub mounting flange and a second mounting surface in abutting engagement with said wheel mounting flange with said peripheral edge extending between said first and second mounting surfaces such that said first segment extends from said second mounting surface and said second segment transitions from said first segment to said first mounting surface.

15. The assembly of claim 14 including a hub transition region between said drum and wheel pilot and said hub mounting flange, said hub transition region defining a third segment extending transversely to said hub mounting flange and said drum and wheel pilot.

16. A method of assembling a vehicle wheel assembly including the steps of:

(a) forming a single pilot mount on an exterior surface of a wheel hub;

(b) positioning a drum on the wheel hub by aligning a portion of the drum relative to the pilot mount;

(c) positioning at least one disc wheel on the wheel hub by aligning a portion of the disc wheel relative to the pilot mount; and (d) securing the wheel hub, drum, and disc wheel together for rotation about a common axis.

17. The method of claim 16 wherein step (b) further includes providing a drum mounting flange with a peripheral edge, forming a first segment with a linear profile on the peripheral edge and a second segment extending transversely from the first segment, and aligning the first segment relative to the pilot mount.

18. The method of claim 17 wherein step (a) further includes providing a hub mounting flange extending transversely to the exterior surface of the hub, forming a hub transition region between the pilot mount and the hub mounting flange with the hub transition forming a third segment extending transversely to the hub mounting flange and the pilot mount, and step (b) further includes positioning the third segment on the hub opposite from the second segment on the drum.

* * * * *

UNITED STATES PATENT AND TRADEMARK OFFICE
CERTIFICATE OF CORRECTION

PATENT NO.     : 6,604,794 B1
DATED          : August 12, 2003
INVENTOR(S)    : Paul R. Messina It is certified that error appears in the above-identified patent and that said Letters Patent is hereby corrected as shown below:

<u>Title page,</u>
Item [*] Notice, should read as follows -- Notice: Subject to any disclaimer, the term of this patent is extended of adjusted under 35 U.S.C. 154(b) by 4 days. --

Signed and Sealed this

Ninth Day of December, 2003

JAMES E. ROGAN
*Director of the United States Patent and Trademark Office*